Dec. 4, 1956     I. GOLDMAN     2,772,917
CONVERTIBLE HARD TOP AUTOMOBILE BODY

Filed Dec. 28, 1953     2 Sheets-Sheet 1

INVENTOR.
*Ida Goldman*
BY
*ATTORNEY*

Dec. 4, 1956     I. GOLDMAN     2,772,917
CONVERTIBLE HARD TOP AUTOMOBILE BODY
Filed Dec. 28, 1953     2 Sheets-Sheet 2
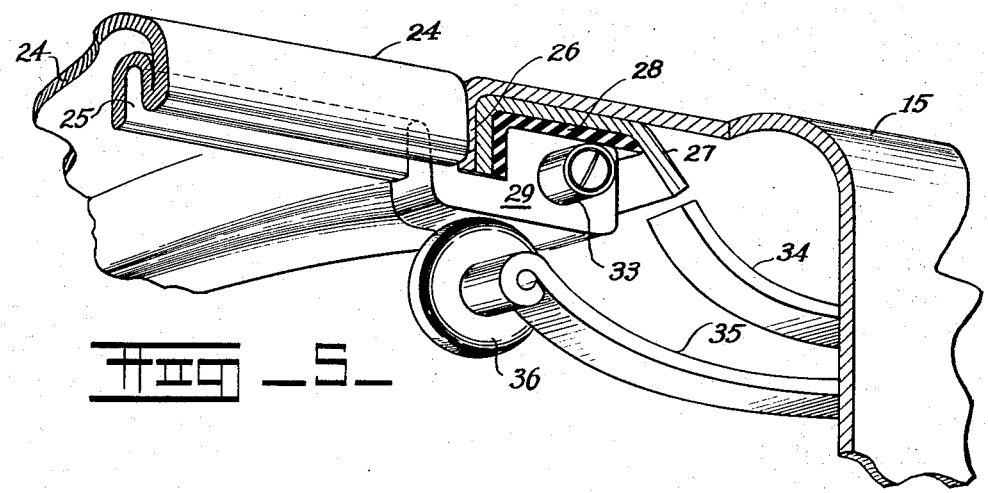
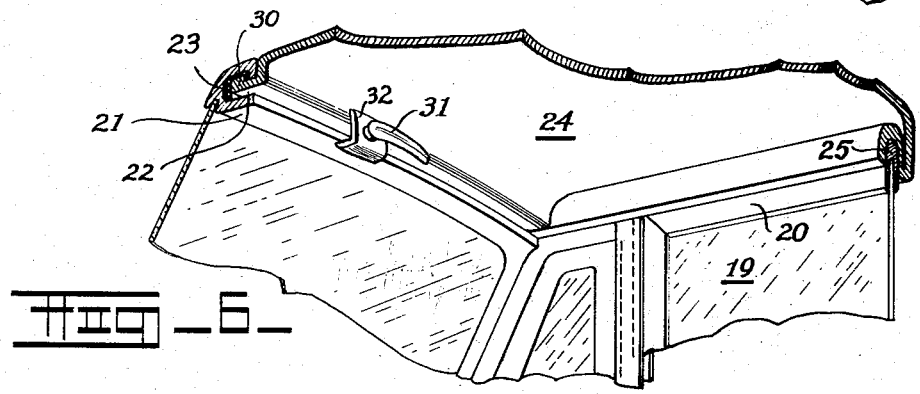
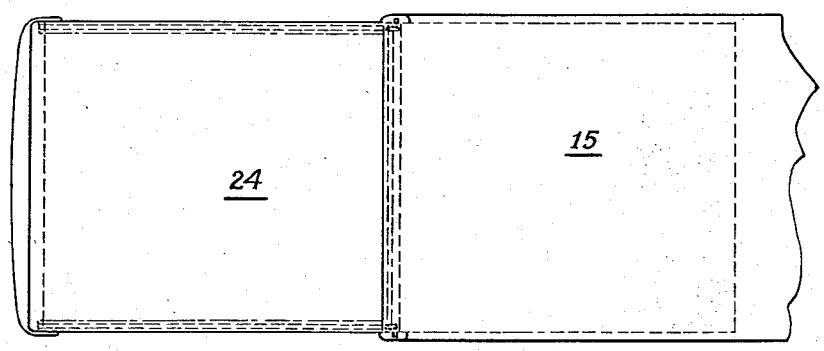
INVENTOR.
*Ida Goldman*
BY
*W. B. Harpman*
ATTORNEY United States Patent Office 2,772,917
Patented Dec. 4, 1956

2,772,917
CONVERTIBLE HARD TOP AUTOMOBILE BODY

Ida Goldman, Youngstown, Ohio

Application December 28, 1953, Serial No. 400,720

1 Claim. (Cl. 296—137)

This invention relates to automobile bodies in general and more particularly to a convertible hard top for such bodies.

The principal object of the invention is the provision of an automobile body having a complete frontal top portion movably disposed with respect to the remainder thereof.

A further object of the invention is the provision of a portion of an automobile top arranged for retractable movement to a position beneath an adjacent portion to completely eliminate a top and top supporting structure in the area above and between the doors of the automobile body.

A still further object of the invention is the provision of a retractable hard top in an automobile body arranged for movement forwardly and rearwardly of said automobile body and vertically with respect thereto when in closed position so as to effect a weather-tight closure with respect to the remaining portion of the automobile body.

A still further object of the invention is the provision of a convertible hard top automobile body, a major frontal portion of the top of which is freely movable to a hidden location in the automobile body.

The convertible hard top construction for automobile bodies disclosed herein comprises an improvement in the art with respect to cloth top convertible bodies and hard top bodies having sliding panels. In such constructions as heretofore known in the art the cloth top convertibles have been desirable formed in that they provided a degree of weather protection when in closed position and are particularly desirable in open position. While the sliding top panels primarily used on foreign cars have afforded an approach to the problem, they have generally and without exception comprised a conventional hard top sedan or coach body, a panel-like portion of the top of which has been removably mounted with the result that at best the opening afforded is relatively limited and the body retains the conventional characteristics of a sedan or coach.

The present invention relates to an improvement with respect to both forms of convertible tops as have heretofore been known in that a complete frontal portion of a hard top sedan, coach or coupe body has been devised for movable positioning in closed or open position moving to a position corresponding with a conventional hard top sedan, coach or coupe body when closed and being completely retracted in the body when in open poosition. As such, the entire area from the windshield to the rear portions of the doors of the body is open to the sky and visibility is unhampered.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 5 is an enlarged detail of a portion of the hard top body taken on line 5—5 of Figure 2.

Figure 6 is a perspective view with parts in cross section showing an enlarged detail of the frontal portion of the convertible hard top.

Figure 7 is a top plan view of an automobile body showing the relative positions of the convertible hard top portion and stationary portion.

Figure 1:
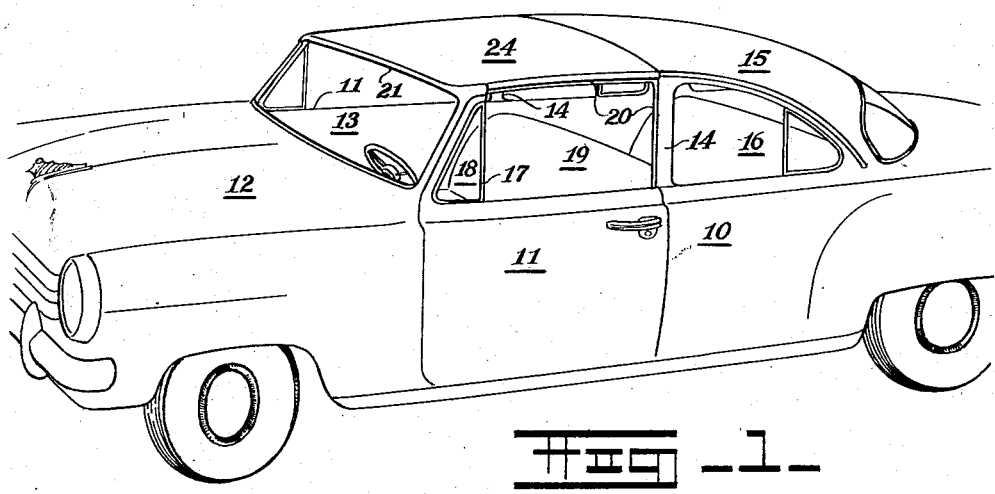
Figure 1 is a perspective view of an automobile body incorporating the convertible hard top.

By referring to the drawings and Figure 1 in particular it will be seen that an automobile body, generally indicated by the numeral 10, has doors 11, a hood portion 12 and a winshield 13. The body 10 includes vertically positioned frame members 14—14 and a fixed top portion 15, the body 10, frame members 14—14 and fixed top portion 15 defining a window opening 16. Each of the doors 11 is provided with a fixed post 17 extending vertically thereabove and with the foremost angular portion of the upper portion of each of the doors 11 forming an area for a ventilating window 18. The doors 11 are each provided with vertically movable windows 19 which are provided with customary metal frame 20, as best shown in Figure 4 of the drawings.

Figure 4:
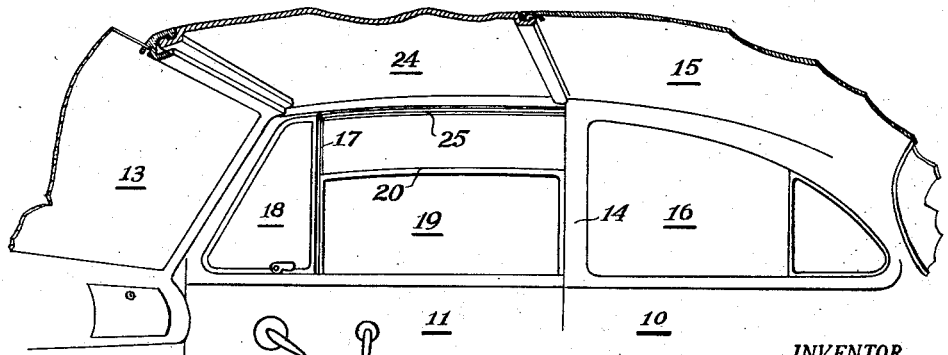
Figure 4 is a perspective view of a portion of the interior of an automobile body showing the hard top convertible portion thereof in closed position and in cross section.

The windshield 13 is mounted in a frame 21, the upper portion of which is transversely arcuate and provided on its inner side with a channel 22, as best shown in Figures 4 and 6 of the drawings. A resilient gasket 23 is mounted in the channel 22 and the channel is adapted to receive the forward edge of a hard top portion 24, the sides of which are downturned and provided with inverted channels 25 which are intended to receive the upper edges of the frames 20 on the windows 19.

A forward transverse edge of the fixed top 15 is downwardly flanged as at 26 and conforms with the forward edge of an inverted U-shape frame member 27 which extends thereacross and thereinunder. The frame member 27 is provided with a resilient gasket 28 and the back edge 29 of the hard top portion 24 is shaped for registry with the channel 27 and against the gasket 28.

Figure 2:
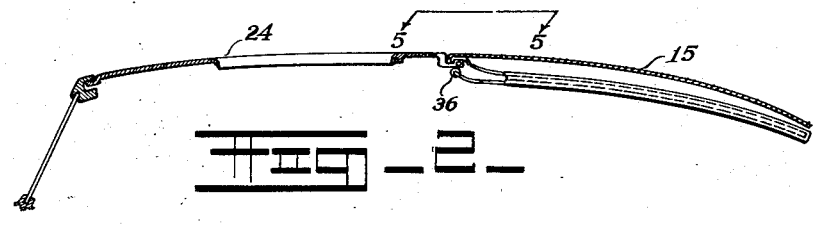
Figure 2 is a longitudinal section through an automobile body showing the convertible hard top in closed position.

A similar construction is formed on the foremost edge 30 of the hard top portion 24 and it will thus be seen that when the hard top portion 24 is in closed position, as shown in Figures 1, 2, 4, 5, 6 and 7, the flanged forward and rearward edges 30 and 29 of the hard top portion will register in the channels 22 and 27 and thereby effect a weather-tight closure and at the same time present the major portion of the hard top portion 24 into horizontal alignment with the fixed top 15, as best shown in Figure 2 of the drawings.

A combination latch and handle 31 is provided on the forward edge 30 by means of which the hard top portion may be manipulated. Partial rotation of the handle 31 serves to cause a crank-shaped portion of its shaft to move an L-shaped latching portion 32 vertically. Such movement will force the forward edge of the hard top portion 24 toward or away from its registering position in the channel 22.

At such time as the latch portion 32 is moved upwardly, the handle 31 and hard top portion 24 may be depressed slightly to free the flange 30 from the channel 22 whereupon the entire hard top portion 24 may be moved rearwardly to a point of concealment beneath the fixed top 15.

Figure 3:
Figure 3 is a longitudinal section through a convertible hard top body showing the movable portion thereof partially retracted.

In Figure 3 of the drawings the hard top portion is shown partially retracted beneath the top 15, it being observed that rollers 33 formed on the rearmost corners of the hard top portion 24 register with and slide between vertically spaced guide rails 34 and 35 while secondary rollers 36 on the forward ends of the guide rails 35 support the hard top portion 24 as it rolls backwardly into retracted position or forwardly from retracted position into closed position.

Figure 5 of the drawing illustrates the relative positioning of the rollers 33 and 36 in enlarged detail as well as the relative positions of the guide rails 34 and 35. It will be observed that the rearmost portion of the channel 27 is shaped to conform with the foremost ends of the guide rails 34 so that the rollers track continuously therealong.

It will be observed that the forward ends of the guide rails 35 are free with respect to their normal longitudinal attachment to the inner surfaces of the fixed top 15 so that a spring action with respect to the positioning of the rollers 36 is provided and which holds the hard top portion 24 firmly throughout its movement.

It will also be seen that when the hard top portion 24 is in closed position, the windows 19 may be closed normally and will register in the channels 25 in a normal manner. Alternately, when the hard top portion 24 is in open or retracted position and the windows 19 lowered, the front portion of the automobile body has every characteristic of a convertible with the top down.

It will thus be seen that the several objects of the invention are met by the convertible hard top automobile body disclosed herein.

Having thus described my invention, what I claim is:

An automobile body having a fixed top portion, a fixed windshield portion and doors spacing said fixed portions longitudinally of said body, a frame defining said fixed windshield portion and having panel receiving formations on its upper inner edge, a hard top portion movably positioned in said fixed top portion for movement outwardly therefrom and inwardly thereinunder, said fixed top portion having vertically spaced parallel guide rails on either side thereof for receiving and guiding said hard top portion, the lower rails being provided with rollers on their foremost ends and said ends comprising spring members normally urging said hard top portion upwardly.

References Cited in the file of this patent

UNITED STATES PATENTS

| | | |
|---|---|---|
| 1,746,349 | Hammond | Feb. 11, 1930 |
| 2,155,357 | Creteur | Apr. 18, 1939 |
| 2,263,216 | Latchford | Nov. 18, 1941 |
| 2,272,535 | Votypka | Feb. 10, 1942 |
| 2,348,579 | Solis | May 9, 1944 |
| 2,434,711 | Mobbs et al. | Jan. 20, 1948 |
| 2,632,670 | Crenshaw | Mar. 24, 1953 |